(12) United States Patent
Czizegg et al.

(10) Patent No.: US 10,857,711 B2
(45) Date of Patent: Dec. 8, 2020

(54) HANDLING DEVICE FOR PLASTIC INJECTION-MOLDED PARTS, INJECTION MOLDING SYSTEM AND METHOD FOR OPERATION

(71) Applicant: Waldorf Technik GmbH, Engen (DE)

(72) Inventors: Wolfgang Czizegg, Steisslingen (DE); Ralf Fuhrmann, Engen (DE); Christian Boos, Gundelfingen (DE)

(73) Assignee: Waldorf Technik GmbH, Engen (DE)

( * ) Notice: Subject to any disclaimer, the term of this patent is extended or adjusted under 35 U.S.C. 154(b) by 255 days.

(21) Appl. No.: 16/102,783

(22) Filed: Aug. 14, 2018

(65) Prior Publication Data

US 2019/0047196 A1 Feb. 14, 2019

(30) Foreign Application Priority Data

Aug. 14, 2017 (DE) .................. 10 2017 118 527

(51) Int. Cl.
| | |
|---|---|
| *B29C 45/04* | (2006.01) |
| *B29C 45/42* | (2006.01) |
| *B29C 45/17* | (2006.01) |
| *B29C 45/32* | (2006.01) |
| *B29L 31/00* | (2006.01) |

(52) U.S. Cl.
CPC .......... *B29C 45/42* (2013.01); *B29C 45/1769* (2013.01); *B29C 45/32* (2013.01); *B29C 45/4225* (2013.01); *B29C 2045/324* (2013.01); *B29C 2045/326* (2013.01); *B29L 2031/753* (2013.01); *B29L 2031/757* (2013.01)

(58) Field of Classification Search
CPC ................................................ B29C 45/4225
See application file for complete search history.

(56) References Cited

FOREIGN PATENT DOCUMENTS

| | | |
|---|---|---|
| DE | 202009009327 U1 | 11/2010 |
| DE | 102013110948 A1 | 4/2015 |
| EP | 2323930 B1 | 3/2012 |
| WO | 2015049350 A1 | 4/2015 |

*Primary Examiner* — Ryan M Ochylski
(74) *Attorney, Agent, or Firm* — Bachman and Lapointe PC; George Coury

(57) ABSTRACT

This invention relates to a handling device for the removal of plastic injection-molded parts, designed as pipette tips, medical reaction vessels or contact-lens molds, from an injection mold tool (11), having a removal gripper having a plurality of receiving positions (1-32; 104, 105) for receiving one injection-molded part from each of the cavities in each instance.

20 Claims, 3 Drawing Sheets

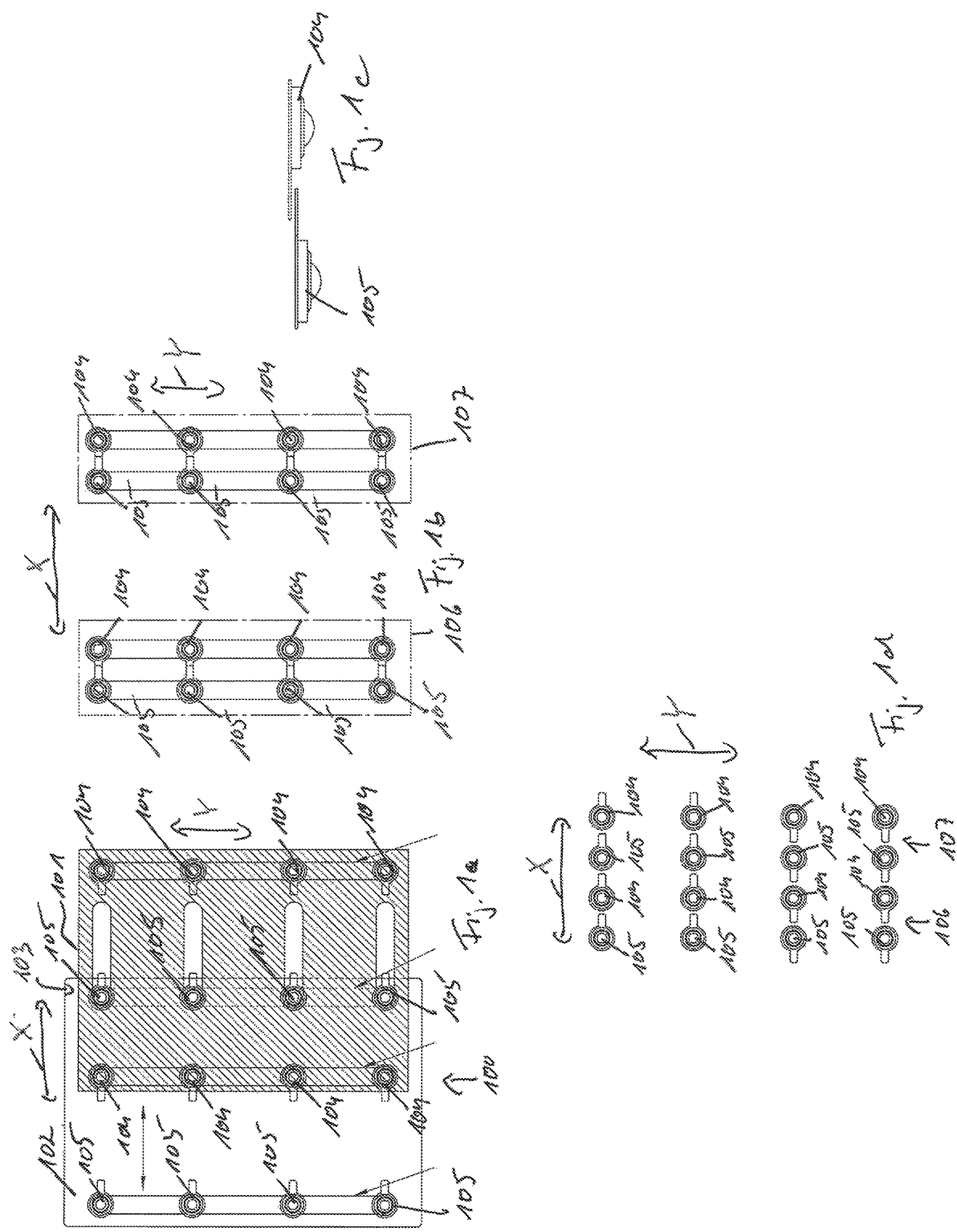

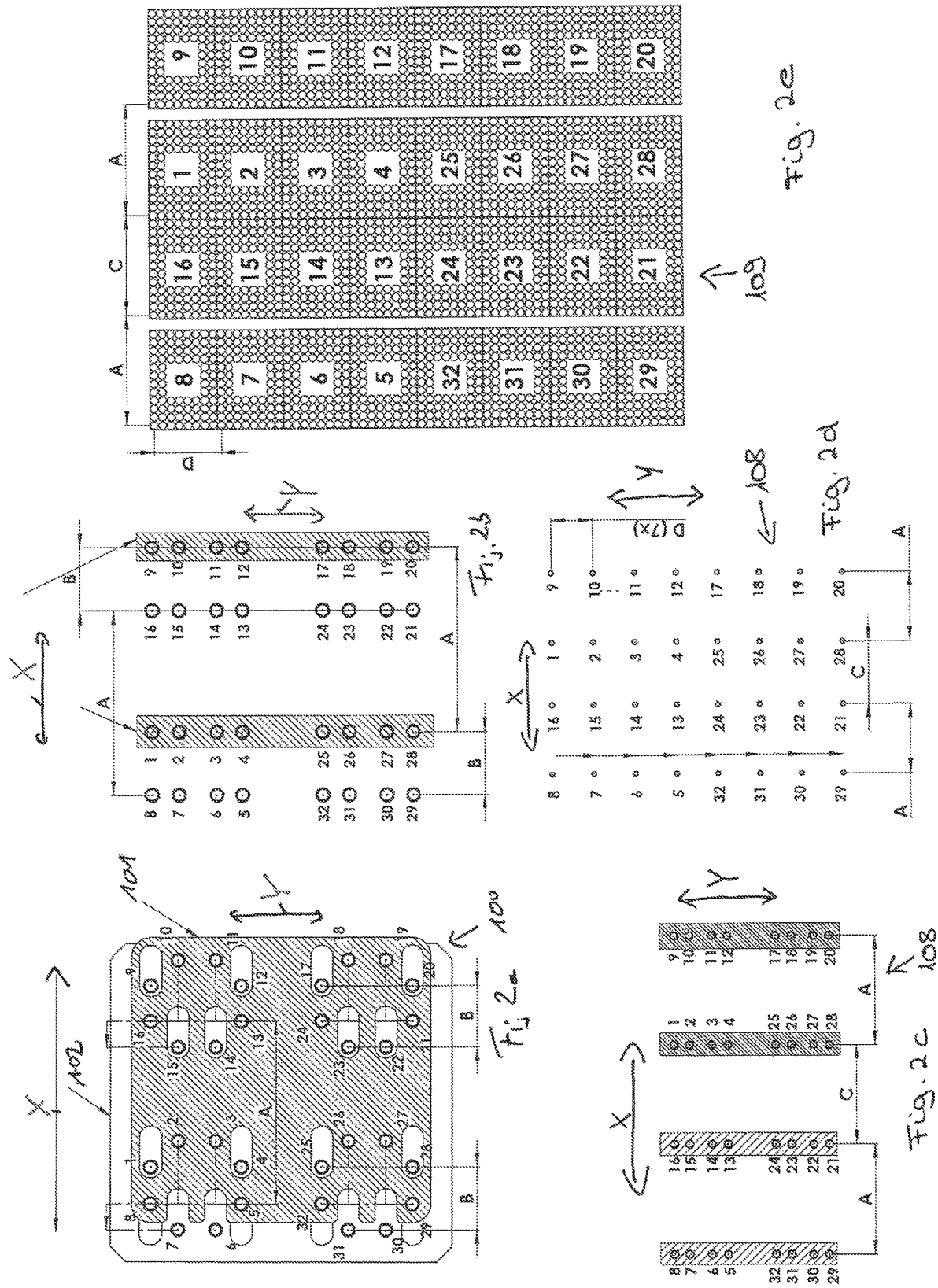

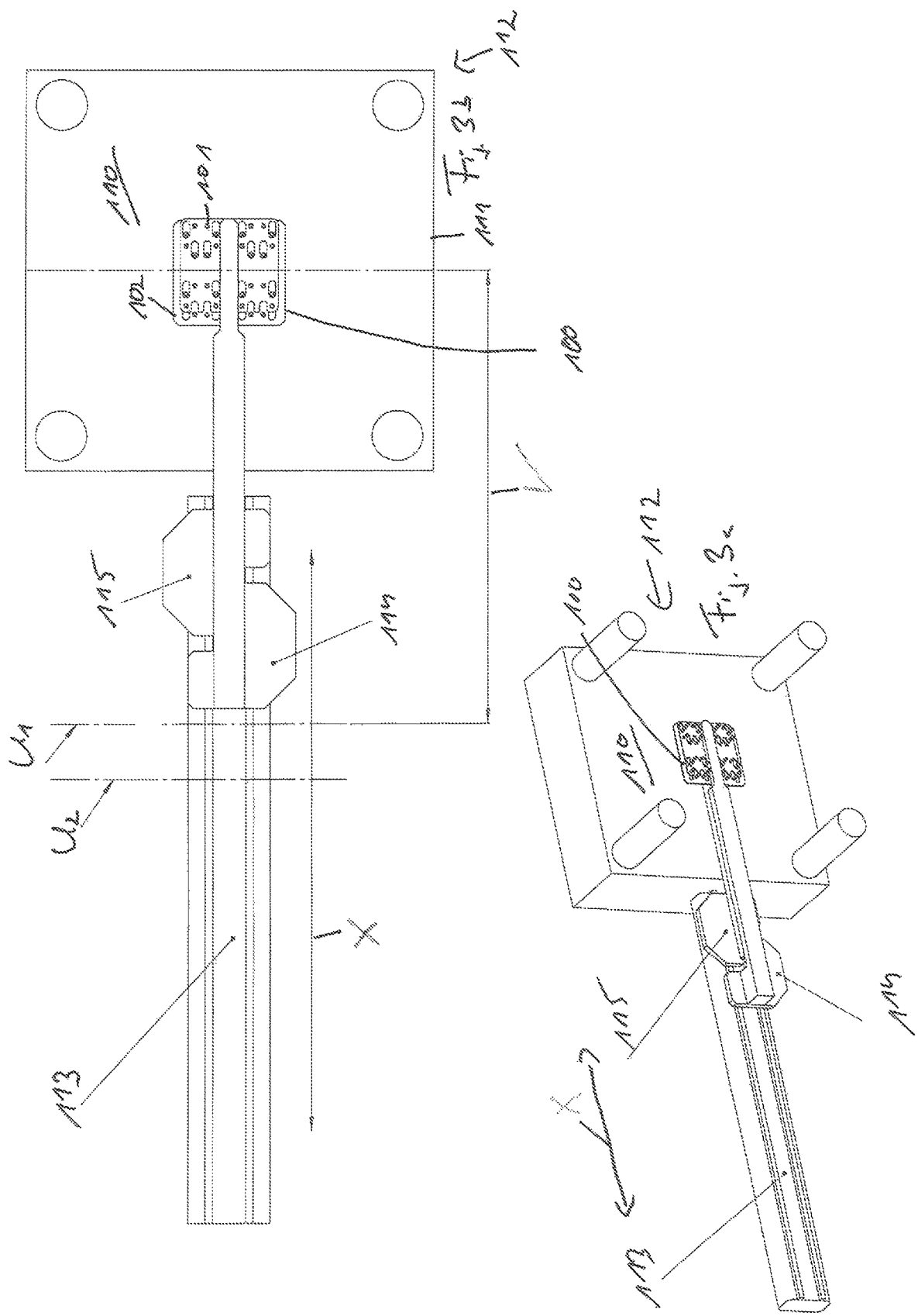

HANDLING DEVICE FOR PLASTIC INJECTION-MOLDED PARTS, INJECTION MOLDING SYSTEM AND METHOD FOR OPERATION

BACKGROUND OF THE INVENTION

The invention relates to a handling device for removing plastic injection-molded parts, in particular designed as pipette tips, medical reaction vessels or contact-lens molds, from an injection mold. The injection mold tool (not the handling device) has several cavity arrangements (cavity groups), which are disposed adjacent to each other in an injection mold surface and which each have several cavities, in particular disposed around a respective center, preferably annularly or rectangular-annularly. The handling device is characterized by a removal gripper having a plurality of receiving positions each for receiving one plastic injection-molded part from one of the cavities of the injection mold tool, wherein the receiving positions are dispersed across a removal gripper surface extension extending along a y-axis and a, preferably horizontal, x-axis which is perpendicular to the y-axis, wherein the receiving positions are disposed on a slide arrangement which can be displaced by means of drive means. The receiving positions each comprise a gripper, such as a mechanical gripper or a vacuum or suction gripper.

Furthermore, the invention relates to an injection molding system, comprising an injection molding device and an injection mold tool which is characterized by the cavity arrangements in the injection mold surface which were described above in conjunction with the handling device; in this instance, the cavities stretch perpendicular (z-axis) to the injection mold tool surface (meaning into the tool), with which the removal gripper is aligned, in particular parallel, in a removal position.

Furthermore, the invention relates to a method for operating a handling device according to the invention and/or an injection molding system according to the invention.

From EP 2 323 930 B1 the loading of final packaging, in particular so-called racks, with pipette tips in a cavity-free manner or alternatively sorted by cavity, is known, wherein the pipette tips are first taken out of cavities of an injection mold tool by means of a removal gripper and are sorted in cavity-free subgroups (groups) and are stored in a horizontal temporary storage, from which the final packaging is then loaded. In practice, the used removal gripper comprises a plurality of receiving positions for each reception of a pipette tip, wherein the receiving positions are disposed on a plurality of slides disposed adjacent to each other and the slides can be spaced farther apart from each other by means of an individual drive for realizing locking strokes along an x-axis. In this context, the slide arrangement is designed such that slides disposed adjacent to each other along the x-axis are mechanically connected via elongated hole connections and are stretched like an accordion by means of the drive for realizing locking strokes. This design has proven to be successful but is technically very demanding and involves high demands in regard to the tolerances since even small tolerances can lead to an instability of the entire field due to the interlinked arrangement of slides disposed adjacent to each other.

From WO 2015/049350 A1 a packaging method comprising a removal gripper without locking strokes is known; in this instance the plastic injection-molded parts are not moved relative to each other but solely between grippers, which can be displaced relative to each other, due to several time-consuming conversion steps to be performed successively.

SUMMARY OF THE INVENTION

Based on the aforementioned state of the art, the object of the invention is provide an improved, robust and simply designed handling device for removing plastic injection-molded parts, in particular in the form auf pipette tips, medical reaction vessels or contact-lens molds, in particular in the scope of a packaging method for packaging the plastic injection-molded parts in a cavity-free manner or sorted by cavity, which allows a relative movement of the plastic injection-molded parts on the removal gripper in a simple manner, in particular in such a manner that a row arrangement having parallel rows for a subsequent formation of a cavity-free subgroup field can be generated from an initial arrangement, in particular not arranged in rows, of the plastic injection-molded parts in the injection mold tool. Furthermore, the object of the invention is to provide an injection molding system with an accordingly improved handling device as well as a method for operation.

In regard to the handling device, this object is attained by the features disclosed herein, i.e. in a generic handling device by the slide arrangement comprising, preferably exclusively, two slides which carry the receiving positions (in particular in the form of mechanical or suctioning grippers), namely a first and a second slide, in particular solely a first and a second slide, wherein the first and the second slide can be displaced relative to each other between a relative removal position, in which the receiving positions align with the corresponding cavities, and a relative transfer position for transferring the plastic injection-molded parts by means of the drive means; and by the first and the second slide each comprising receiving positions for plastic injection-molded parts spaced apart along the x-axis; and by the first and the second slide interlinking, being formed in a nested manner and disposed along the x-axis in such a manner that in the relative removal position (at least) one receiving position of the second slide, which is preferably spaced apart from the two receiving positions along the x-axis, is disposed along the x-axis between two receiving positions of the first slide, which are spaced apart along the x-axis, and/or that (at least) one receiving position of the first slide, which is preferably spaced apart from the two receiving positions along the x-axis, is disposed along the x-axis between two receiving positions of the first slide, which are spaced apart along the x-axis. In this context, the receiving position of one of the slides, which is arranged between each of two receiving positions of the other slide, is disposed at an offset, preferably disposed at a distance, towards the two receiving positions, in between which it is disposed, along the y-axis.

In order to realize the overlapping or interlocking arrangement of the first and the second slide along the x-axis, they are guided past each other, preferably in sections, for example in a z-axis that extends perpendicular to the y-axis and x-axis, or they have corresponding recesses necessary in order to be displaced in an interlinking manner with their receiving positions along the x-axis.

In regard to the injection molding system, this object is attained by the characteristics disclosed herein and in regard to the method by the characteristics disclosed herein, in the case of a generic method therefore owing to the fact that in a removal position of the removal gripper, in which the removal gripper is disposed, in particular parallel, to the injection mold surface and to the fact that the receiving positions of the removal gripper align with the corresponding cavities or rather the plastic injection-molded parts of the injection mold tool received therein, wherein when a first and second slide are disposed in the relative removing position, preferably comprising a shared removal stroke of the slides or separate removal strokes of the slides, the plastic injection-molded parts, in particular in the form of pipette tips, medical reaction vessels or contact-lens molds, are removed from the cavities while keeping the relative position of the x-axis of the plastic injection-molded parts in such a way that (at least) one plastic injection-molded part, which is disposed in a receiving position of the second slide, is disposed along the x-axis in between two plastic injection-molded parts, which are each disposed in a respective receiving position of the first slide, and/or that (at least) one plastic injection-molded part, which is disposed in a receiving position of the first slide, is disposed along the x-axis in between two plastic injection-molded parts, which are each disposed in a receiving position of the second slide, wherein the plastic injection-molded part of one of the slides, which is arranged between two plastic injection-molded parts of the other slide, is preferably disposed along the y-axis at an offset to, in particular spaced apart from, the two plastic injection-molded parts.

Advantageous developments of the invention are indicated in the dependent claims. The invention relates to all combinations comprising at least two characteristics disclosed in the description, the claims and/or the figures.

To avoid repetitions, characteristics disclosed according to the device are also deemed as claimed and disclosed according to the method. Likewise, characteristics disclosed according to the method are also deemed as claimed and disclosed according to the device.

The idea of the invention is to realize the slide arrangement having two, in particular exclusively two, slides, comprising or consisting of a first and a second slide, wherein both slides overlap or rather interlock along the x-axis in a way that receiving positions for cavities, or rather plastic injection-molded parts arranged therein, which are spaced apart along the x-axis, are disposed on both slides in the relative removal position along the x-axis, wherein the overlapping or rather the interlocking of the two slides is realized such that a receiving position of the second slide is disposed between two receiving positions of the first slide, which are spaced apart along the x-axis, in particular the receiving position of the second slide being disposed at an offset to these receiving positions along the y-axis, more preferably spaced apart from these receiving positions, and/or such that a receiving position of the first slide is disposed between two receiving positions of the second slide, which are spaced apart along the x-axis, in particular the receiving position of the first slide being disposed at an offset to these receiving positions along the y-axis, more preferably spaced apart from these receiving positions. More preferably, receiving positions of the first and second slides for plastic injection-molded parts from cavities, which are spaced apart along the x-axis, alternate in the relative receiving position of the first and the second slide along the x-axis. By means of this distributed, alternating arrangement of plastic injection-molded parts or rather receiving positions on the slide, it is possible and realized in the scope of this invention that the receiving positions, which are dispersed on the two slides (and which alternate along the x-axis), are rearranged, particularly compressed and/or linearized, by means of a relative displacement of the slides to each other along the x-axis for a subsequent transfer step.

In this context, the receiving positions of the first slide, which are spaced apart along the x-axis, as well as the receiving positions of the second slide, which are spaced apart along the x-axis, are rigidly interconnected so that an accordion effect, as realized in the state of the art, is prevented, resulting in lower tolerance requirements and a simpler design. Furthermore, the arrangement according to the invention, which is provided in a further embodiment of the invention, allows realizing the relative displacing movement of the receiving positions or rather the slides in the manner of a, in particular electric, displacement transmission, and thus saving time and increasing precision, namely by superposing the relative movement of the two slides or by the relative movement taking place at the same time with a shared displacing movement of both slides along the x-axis away from the injection mold in at least one transfer position which is disposed next to the injection mold tool, for transferring the plastic injection-molded parts to a transfer gripper, said plastic injection-molded parts being relatively shifted along the x-axis. For realizing the gear it is necessary and also intended in a further embodiment of the invention, to assign each of the two slides their own, in particular electromotive, preferably servo-motive, alternatively pneumatic or hydraulic, drive, the drives being constructed and actuated in such a way that they realize a relative displacing movement of the two slides from the relative removal position to the relative transfer position for realizing the gear solution and simultaneously displace the two slides and consequently the entire removal gripper from the removal position to the transfer position, i.e. away from the cavities, towards a transfer gripper during this relative displacing movement.

It is even more preferable if the first and the second slide are realized, disposed and displaceable relative to each other by means of the drive means in such a way that the first slide carries several, in particular more than two, first groups (which are spaced apart in the relative removal position along the x-axis) of several receiving positions, which are each adjacent along the y-axis, preferably at an offset, more preferably spaced apart, even more preferably disposed in the same position along the x-axis, and that the second slide carries several, in particular more than two, second groups (which are spaced apart in the relative removal position along the x-axis) of several receiving positions, which are each adjacent along the y-axis, in particular at an offset and/or spaced apart and more preferably disposed in the same position along the x-axis, and that the first and second groups of receiving positions are disposed in an alternating manner in the relative removal positions along the x-axis.

Due to the alternating arrangement of groups of receiving positions on the different slides, it is possible to remove and to displace relative to each other cavity arrangements, which are adjacent along the x-axis, or rather plastic injection-molded parts, which are arranged in their cavities, by means of the slide arrangement according to the invention.

It is even more preferable if the first and the second slide are realized, disposed and displaceable relative to each other by means of the drive means in such a way that in the relative transfer position, the receiving positions are disposed solely in rows that extend along the y-axis, preferably parallel, i.e. linear, and/or in such a way that rows of receiving-position row pairs are disposed closer together along the x-axis in the relative transfer position than in the relative removal position. In other words, the first and the second slide are displaced relative to each other or can be relatively displaced by a corresponding control of the drive means along the x-axis in such a manner that rows of receiving positions which extend along the y-axis are maintained or preferably realized from a discontinuous row arrangement. Additionally or alternatively, it is conceivable to dispose closer together rows of receiving positions, which extend along the y-axis and are dispersed on both slides, in particular by maintaining a row arrangement, i.e. to compress them, a further compression then being realized by means of an optional multiple-step transfer, which will be explained further on.

It is even more preferable if the first and the second slide are realized, disposed and displaceable relative to each other by means of the drive means that in the relative removal position, the relative receiving positions of the removal gripper are disposed or dispersed in several receiving-position arrangements (groups), in particular disposed in a circular manner, around a respective center, in particular annular or rectangular annular, the arrangement of the receiving positions in the receiving-position arrangements (groups) corresponding to the arrangement of the cavities in the cavity arrangements. This embodiment enables reforming the plastic injection-molded parts or the receiving positions carrying the plastic injection-molded parts from the initial receiving-position arrangements (groups), in particular stretching them along the x-axis, for the purpose of forming the aforementioned rows extending along the y-axis or, in a rectangular annular arrangement, to either space apart already existing rows of row pairs further apart from each other or, which would be more preferable, to bring them closer together along the x-axis.

An embodiment is particularly preferred in which the receiving positions, which are initially disposed annularly, are disposed in rows, the receiving-position arrangements (groups), which are each disposed annularly, being dispersed on the first and the second slide.

In an annular arrangement of the receiving positions in the receiving-position arrangements (groups), it is also conceivable that two or more of the receptions of a receiving-position arrangement (group) are already disposed adjacent along the y-axis in the relative removal position and are in the same position on the x-axis and therefore form a type of (short) row. By means of the relative displacing movement of the first and the second slide to each other, these shortened rows, which are each formed on one of the two slides, can be expanded by respective receiving positions by adding receiving positions of the second slide in corresponding spaces along the y-axis so that the longitudinal extension of the rows along the y-axis increases. Additionally or alternatively to the extension of the rows by adding receiving positions of the one slide to spaces along the y-axis between receiving positions of the other slide, rows can be expanded at the end, i.e. in such a way that at least one receiving position of the one slide is displaced along the x-axis in such a way that said receiving position connects to an already existing receiving-position row (which extends along the y-axis) of the other slide in the front or in the back.

Even more preferable is an aforementioned embodiment of the handling device in which the first slide and the second slide each comprise a, in particular electromotive, preferably servo-motive, drive, said drives preferably being controlled or being able to be controlled in such a way that the relative movement of the slides to each other can be carried out or is carried out between the relative removal position and the relative transfer position during a shared displacing movement of the slides along the x-axis from a removal position of the removal gripper in front of the cavities to a transfer position of the removal gripper, adjacent to the injection mold tool (outside) of two partial parts of the injection mold. In other words, this embodiment is a, in particular electrical, gear in which the two slides are displaced along the x-axis from the removal position to the transfer position or to one of several transfer positions at different speeds or at speeds differing from one another and thus move relative to each other for the purpose of displacing or shifting the relative receiving position of the receiving positions to the transfer position of the receiving position.

It is particularly preferred if the handling device comprises a transfer gripper in addition to the removal gripper, the plastic injection-molded parts being capable of being transferred on said transfer gripper in their relative transfer position (while maintaining the relative transfer position) in two steps, a relative movement between the removal gripper and the transfer gripper being realized along the x-axis between the steps, in particular via shared displacement of the first and the second slide, in particular using separate drives, in particular in such a way that the plastic injection-molded parts on the transfer gripper are disposed so as to deviate or be different in comparison to the relative position of the plastic injection-molded parts prior to the transfer on the removal gripper. Even more preferably the, preferably only, two-step transfer is carried in such a way that rows of receiving positions, which have been present previously on the removal gripper and extend along the y-axis, or plastic injection-molded parts disposed thereon are preserved or, in other words, that the row arrangement of the plastic injection-molded parts along the y-axis is not influenced or changed by the transfer but preferably only the relative position of adjacent rows along the x-axis are influenced or changed either to compress rows of plastic injection-molded parts or to space them further apart from each other, in particular to equalize spaces, two embodiments being understood under the term equalize, namely a first embodiment in which the distance of rows, which are spaced apart along the x-axis and extend along the y-axis, is the same after the transfer and an alternative second embodiment in which a previously existing difference in space is reduced via the multi-step transfer (and is then not necessarily the same).

An embodiment is even more preferred in which the transfer gripper has a relative displacement functionality along the y-axis and/or along the longitudinal row extension of the plastic injection-molded parts in such a way that the rows of receiving positions of the transfer gripper or the plastic injection-molded parts disposed thereon or adopted by the removal gripper are straightened out, i.e. are, in particular uniformly, spaced further apart from each other, along the longitudinal row extension in order to create more room for the preferred group field formation on the temporary storage.

It is even more preferred if the transfer is realized such owing to a corresponding control of the transfer gripper and/or of the removal gripper that complete rows of plastic injection-molded parts, which extend along the y-axis, are capable of being transferred from the removal gripper to the transfer gripper in the respective transfer steps and/or that plastic injection-molded parts are capable of being transferred or are transferred from both the first and the second slides in each of the transfer steps—even more preferably the respective transferred rows of plastic injection-molded parts or receiving positions extending across the first and the second slide.

It is particularly expedient to the invention if in addition to the aforementioned transfer gripper the handling device comprises a, in particular horizontal, temporary storage having a plurality of positions for receiving a respective plastic injection-molded part, said transfer gripper or rather its drive means being controlled in such a way that the plastic injection-molded parts can be deposited or positioned on the temporary storage in cavity-free groups (subgroups) by the transfer gripper. In a simple embodiment, these are linear or row-shaped, cavity-free groups. The embodiment of the handling device according to the invention, however, enables a preferred two-dimensional, in particular rectangularly outlined, group field formation in which the plastic injection-molded parts are disposed, in particular in the shape of a matrix, along two field axes, in particular in columns and rows, which extend perpendicular to each other.

It is particularly expedient if from said subgroups final packagings for distribution to the final consumer, in particular racks for laboratory devices, are loaded in another method step or in a packaging section of the device, said final packagings being loaded cavity-free, i.e. only having plastic injection-molded parts from only one group, in particular having a complete group in each instance, or being loaded sorted by cavity, i.e. having plastic injection-molded parts from a part of the group, even more preferably having several complete groups in each instance but not having plastic injection-molded parts from all groups.

The method according to the invention has already been described in conjunction with the handling device according to the invention and the injection molding system according to the invention. What is essential is that the first and the second slide of the slide arrangement remove plastic injection-molded parts from the injection mold such that a plastic injection-molded part of the second slide or on the second slide is disposed between plastic injection-molded parts of the first slide, which are spaced apart along the x-axis, and/or a plastic injection-molded part of or on the first slide is disposed between two plastic injection-molded parts disposed on the second slide, said plastic injection-molded parts, which are disposed on different slides and are adjacent along the x-axis, preferably being disposed at an offset, particularly preferably being spaced apart, along the y-axis. From the afore-described removal position, the slides are displaced relative to each other to the relative transfer position whereby the plastic injection-molded parts disposed on the different slides are reformed or formed different, in particular in such a way that, preferably parallel, rows of plastic injection-molded parts, which extend along the y-axis, from an initially annular or rectangular-annularly arrangement of the plastic injection-molded parts are first formed on the removal gripper in the cavities and then in the relative removal position or already existing rows of plastic injection-molded parts are brought closer together along the x-axis or are spaced apart from each other.

With regard to other advantageous embodiments of the method according to the invention, the foregoing description is referred to in conjunction with the handling device and the injection molding system. In particular the functionally expressed device features are to be viewed as disclosed and claimed as a component of the method.

BRIEF DESCRIPTION OF THE DRAWINGS

Further advantageous embodiments can be derived from the following description of preferred exemplary embodiments as well as from the drawings.

In the following,

FIG. 1a to FIG. 1d illustrate different method steps of a preferred embodiment of an operating method according to the invention, a perspective view of the left half of FIG. 1b being illustrated in FIG. 1c, FIG. 2a to FIG. 2e illustrate another preferred alternative embodiment of an operating method realized according to the concept of the invention, and FIG. 3a and FIG. 3b illustrate different views of a preferred embodiment of a removal gripper of a handling device realized according to the concept of the invention.

In the figures the same elements and elements having the same function are marked with the same reference numerals.

DETAILED DESCRIPTION

In FIG. 1a, a removal gripper 100 of a handling device realized according to the concept of the invention is illustrated. The removal gripper 100 comprises a first slide 101 and a second slide 102, said first slide 101 of the illustrated slide arrangement being arranged above the second slide 102 of the slide arrangement in the illustration plane, a row-shaped arrangement 103 of four (in the exemplary embodiment) relative receiving positions of the second slide 102, which are spaced along the y-axis, penetrating the first slide 101 perpendicular to the illustration plane. For this purpose, corresponding oblong holes, which also enable a relative displacement movement along the x-axis, are provided in the first slide 101.

It can be seen that on the first slide 101 a total of four pairs of receiving positions 104 are disposed which preferably each comprise a suction gripper and of which in each instance two are disposed along the y-axis, said receiving positions 104 of each pair of receiving positions of a pair adjacent along the x-axis being spaced apart in the illustrated relative removal position. On the second slide 102 as well, four pairs of receiving positions 105 of which in each instance two are adjacent along the x-axis are realized in the illustrated exemplary embodiment, said pairs being distanced to each other along the y-axis. The two slides 101 and 102 are disposed in the illustrated relative removal position in such a way that a receiving position 105 of the second slide is disposed in each instance between two receiving positions 104 of the first slide 101 spaced apart along the x-axis and that a receiving position 104 of the first slide 101 is simultaneously disposed between two receiving positions 105 spaced apart along the x-axis.

In the illustrated exemplary embodiment, four receiving positions 104, 105, which are dispersed on the two slides 101, 102, each correspond to a cavity arrangement of four cavities relative to a relative position of the receiving positions 104, 105, said cavities and receiving positions being disposed circularly around a respective center and this rectangular-annularly in the present exemplary embodiment. In the illustrated relative position, the receiving positions 104, 105 align with cavities or cavity arrangements of an injection mold tool perpendicular to the illustration plane, both slides 101, 102 being oriented parallel to an injection mold tool surface. Via a shared removal stroke or via removal strokes separate from one another or carried consecutively, the plastic injection-molded parts are removed from the cavities in such a manner that a plastic injection-molded part, such as a contact-lens injection mold in this instance, is disposed on each receiving position 104, 105.

After the adoption of the plastic injection-molded parts from the cavities of the injection mold tool, the slides 101, 102 are displaced relative to each other along the x-axis via drive means (not illustrated) so that the two left (in FIG. 1a) rows of receiving positions 104, 105 extending along the y-axis move closer together along the x-axis, just like the two right (in the illustration plane) rows of receiving positions 104, 105 extending along the y-axis. This yields the arrangement of the receiving positions 104, 105 illustrated in FIG. 1b or rather of the plastic injection-molded parts disposed thereon. For reasons of clarity, a representation of the slides has been omitted in FIG. 1b. Simultaneously to the described relative displacement movement of the slides 101, 102 to the relative transfer position of the receiving positions 104, 105 illustrated in FIG. 1b, both slides 101, 102 are displaced together along the x-axis from a position in front of the injection mold tool surface to a first transfer position of the removal gripper, in which a two-fold transfer of plastic injection-molded parts from removal grippers to a transfer gripper is initiated. In this context, a first group 106 of plastic injection-molded parts are transferred, which are disposed on receiving positions 104, 105 and are dispersed on the two slides 101, 102 and this by maintaining the row arrangement. Subsequently, a relative displacement movement is carried out between the removal gripper and the transfer gripper to a second transfer position, preferably via a shared, in particular uniform, displacement of the two slides 101, 102 along the x-axis in order to then transfer a second group 107 of plastic injection-molded parts to the transfer gripper. The result of the two-step transfer is illustrated in FIG. 1d. It can be seen that the two groups of plastic injection-molded parts 106, 107 are or have been moved closer together along the x-axis. Purely for the purpose of elucidation, reference numerals 104' and 105' are illustrated in FIG. 1d which correlate with the receiving positions 104, 105 of the removal gripper. In other words, the reference numerals 104', 105' in FIG. 1d serve for elucidation and reference plastic injection-molded parts or positions on the transfer gripper so as to underline from which receiving positions 104, 105 of the removal gripper these plastic injection-molded parts stem.

FIGS. 2a to 2e illustrate an alternative, more complex embodiment of the method or of function units required therefor. In FIGS. 2a to 2d, the individual receiving positions for plastic injection-molded parts having the numerals 1 to 32 are marked. In FIG. 2e, in which a temporary storage having cavity-free group fields is illustrated, it is marked with the numerals 1 to 32 that the respective group is realized cavity-free from plastic injection-molded parts which were transferred using the assigned receiving position number, each receiving position always being assigned a specific, i.e. the same, cavity.

In FIG. 2a, in turn, an embodiment of a removal gripper 100 having a first slide 101 and a second slide 102 is illustrated, said first slide 101 being disposed above said second slide 102 in the illustration plane. It can be seen that overall 32 removal positions are uniformly dispersed on the two slides 101, 102, said removal positions being annularly disposed in removal-position arrangements, presently in arrangements of 8, around a respective shared center—this reflects the arrangement of the cavities in the plastic injection-molded parts. FIG. 2a illustrates the relative removal position of the two slides 101, 102 for respectively receiving plastic injection-molded parts realized as pipette tips or medical reaction vessels. From FIG. 2a it is moreover yielded that receiving-position arrangements are disposed next to each other along the y-axis as well along the x-axis via the slides 101, 102. Only as an example the uniform dispersion of the receiving positions 1 to 8 on the two slides 101, 102 is elucidated by means of the receiving-position arrangement illustrated in the upper left hand corner in the illustration plane. It can be seen that the receiving positions 8, 2, 3, 5 are disposed on the first slide 101 and the receiving positions 7, 1, 4, 6 are disposed on the second slide 102.

After the adoption of the plastic injection-molded parts from the cavities aligning with the receiving positions 1 to 32 in the relative removal position of the slides 101, 102, the two slides 101, 102 are displaced relative to each other along the x-axis so that the situation illustrated in FIG. 2b is yielded in which the receiving positions are now no longer disposed in circular groups but in rows extending along the y-axis. This relative displacement movement along the x-axis between the slides 101, 102 takes place in the illustrated exemplary embodiment during a shared movement of the two slides 101, 102 along the x-axis from a removal position to a transfer position in which a transfer to a transfer gripper 108 is initiated. The situation on the transfer gripper 108 is illustrated in FIG. 2c. In order to realize said situation, the rows of plastic injection-molded parts, which are hatched in FIG. 2b and extend along the y-axis, are first transferred to the transfer gripper 108—in this context, the distance A must be maintained since no relative movement takes place along the x-axis between the receiving positions of a respective slide. Subsequently, the other two rows of plastic injection-molded parts are transferred, which are hatched more narrowly in FIG. 2c, and this in a distance C to the previously transferred rows of plastic injection-molded parts, said distance C corresponding to a group field width of the temporary storage 109 according to FIG. 2e, a row (1, 2, 3, 4, 25, 26, 27, 28) of plastic injection-molded parts, which have already been transferred during the first transfer, having been passed over (to the left in the illustration plane) by a row (16, 15, 14, 13, 24, 23, 22, 21) of the plastic injection-molded parts, which are to be transferred during the second transfer, in order to produce the distance C so that as a result the rows of plastic injection-molded parts of the first slide stand beside the plastic injection-molded parts of the second slide and an overlapping arrangement is no longer available, such an arrangement also being possible to realize depending on the space or the space available. The two rows of plastic injection-molded parts (having the more narrow hatch) transferred second each also comprise the distance A to each other. The distance B between two adjacent rows of plastic injection-molded parts or receiving positions on the removal gripper according to FIG. 2d is surmounted or rather is not found on the transfer gripper 108 in the arrangement according to FIG. 2c.

In the illustrated exemplary embodiment, the transfer gripper 108 is equipped with another functionality which allows straightening out the plastic injection-molded parts of the rows, which extend on the removal gripper along the y-axis, by means of the transfer gripper 108 after the adoption along the longitudinal row extension, i.e. to evenly space them further apart from each other and this around a group field length D extending perpendicular to the group field width C. In this arrangement, the transfer on the horizontal temporary storage 109 according to FIG. 2e is carried out, a storage position displaced by a plastic injection-molded part being initiated from transfer to transfer in this instance in order to fill the illustrated group fields cavity-free as a result via a multiple storage.

In FIGS. 3a and 3b, the removal gripper 100 according to FIGS. 2a and 2b is illustrated in different views and this in a removal position parallel in front of an injection mold tool surface 110 of an injection mold tool 111 of an injection molding device 112. In the injection mold tool surface 110 (plane), the cavity arrangements are disposed, each comprising cavities, which are disposed circularly, presently annularly, around a respective center and with which the relative receiving positions on the slide 101, 102 align. The two slides 101, 102 are each assigned an electromotive drive (not illustrated) by means of which the respective slides 101, 102 are capable of being displaced by a removal stroke along the x-axis and are capable of being displaced relative to each other from the illustrated relative removal position to the relative transfer position. By surmounting the displacement hub V, the slides 101, 102 are displaced from the illustrated removal position first to a first transfer position $U_1$ and then to a second transfer position $U_2$, the stepped or step-wise transfer of row arrangements of plastic injection-molded parts, which is elucidated in conjunction with FIGS. 2b and 2c, taking place in the two transfer positions $U_1$, $U_2$. The reference numeral 113 illustrates a gripper axis extending along the x-axis and having the drive belt which can be driven electromotively, each drive belt being capable of being driven by a servomotor (not illustrated), and each drive belt interacting with a drive section 114, 115 of the slides 101, 102 on the axis 113. For realizing a compact arrangement of the drive sections 114, 115, said drive sections 114, 115 are disposed in an L shape and overlap along the x-axis.

1-32 receiving position
100 removal gripper
101 first slide
102 second slide
103 arrangement
104 receiving position or plastic injection-molded parts
105 receiving position or plastic injection-molded parts
106 first group
107 second group
108 transfer gripper
109 temporary storage
110 injection mold tool surface
111 injection mold tool
112 injection molding device
113 axis of the removal gripper
114 drive section
115 drive section
V displacing stroke
U1 first transfer position
U2 second transfer position
X x-axis
Y y-axis

The invention claimed is:

1. A handling device for the removal of plastic injection-molded parts, designed as pipette tips, medical reaction vessels or contact-lens molds, from an injection-mold die (11) having several cavity arrangements, which are disposed adjacent to each other in an injection mold surface (110) and which each have several cavities disposed around a respective center; having a removal gripper having a plurality of receiving positions (1-32; 104, 105) each for receiving one injection-molded part from one of the cavities, wherein the receiving positions (1-32; 104, 105) are dispersed across a removal gripper surface extension extending along a y-axis and an x-axis which is perpendicular to the y-axis, wherein the receiving positions (1-32; 104, 105) are disposed on a slide arrangement which can be displaced by means of drive means, wherein the slide arrangement has two slides carrying the receiving positions (1-32; 104, 105), comprising a first (101) and a second slide (102) which can be displaced between a relative removal position, in which the receiving positions (1-32; 104, 105) align with the corresponding cavities, and a relative transfer position for transferring the plastic injection-molded parts by means of/using the drive means and in that the first (101) and the second slide (102) each have receiving positions along the x-axis, which are spaced apart, for plastic injection-molded parts and wherein the first (101) and the second slide (102) are formed and disposed interconnected along the x-axis in such a manner that in the relative removal position
- a receiving position of the second slide (102), is disposed along the x-axis between two receiving positions of the first slide (101), which are spaced apart along the x-axis, and/or
- a receiving position of the first slide (101) is disposed along the x-axis between two receiving positions of the second slide (102), which are spaced apart along the x-axis.

2. The handling device according to claim 1, wherein the first (101) and second slide (102) are designed, disposed and adjustable relative to each other by means of the drive means in such a manner that the receiving positions (1-32; 104, 105) are only disposed in parallel, rows extending along the y-axis in the relative transfer position and/or in such a manner that rows of row pairs are disposed closer together along the x-axis in the relative transfer position than in the relative removal position.

3. The handling device according to claim 1, wherein the first (101) and the second slide (102) are designed, disposed and adjustable relative to each other by means of the drive means in such a manner that the receiving positions (1-32; 104, 105) are disposed in several receiving position arrangements around a respective center in the relative removal position and/or wherein rows extending along the y-axis each comprise fewer receiving positions or are available in larger numbers than in the relative transfer position.

4. The handling device according to claim 1, wherein the first (101) and the second slide (102) are designed, disposed and adjustable relative to each other by means of the drive means in such a manner that the first slide (101) supports several first groups, which are spaced apart along the x-axis, of several receiving positions, which are adjacent along the y-axis, in the relative removal position and wherein the second slide (102) supports several second groups, which are spaced apart along the x-axis, of receiving positions, which are adjacent along the y-axis, in the relative removal position and wherein the first (106) and second groups are disposed in an alternating manner in the relative removal position.

5. The handling device according to claim 1, wherein the first slide (101) and the second slide (102) each comprise one, electromotive, drive, wherein the drives are preferably controlled in such a manner that the slides (101, 102) can be moved relative to each other between the relative removal position and the relative transfer position during a joint displacement movement of the slides (101, 102) along the x-axis from a removal position in front of the cavities to a transfer position adjacent to the injection mold tool (111).

6. The handling device according to claim 1, wherein the receiving positions (1-32; 104, 105) disposed on a respective slide (101, 102) have a relative position to each other along the x-axis that is not automatically adjustable.

7. The handling device according to claim 1, wherein the handling device comprises a transfer gripper (108), to which the plastic injection-molded parts can be transferred in the relative transfer position in two steps, wherein a relative movement between the removal gripper and the transfer gripper (108) is implemented between the steps, by displacing the first (101) and second slide (102) together along the x-axis, while keeping the relative transfer position of the slides (101, 102), said relative movement being implemented such that receiving positions and/or plastic injection-molded parts on the transfer gripper (108) are arranged differently relative to each other in comparison to the situation on the removal gripper (101).

8. The handling device according to claim 7, wherein while keeping the row arrangement of the receiving positions (1-32; 104, 105), the relative movement of the removal gripper (101) and the transfer gripper (108) can be realized such that the distance of the rows along the x-axis can be variable during the transfer.

9. The handling device according to claim 7, wherein during the respective transfer steps, complete rows of plastic injection-molded parts can be transferred from the removal gripper to the transfer gripper (108) and/or wherein during each of the transfer steps, plastic injection-molded parts can be transferred from the removal gripper to the transfer gripper (108) by both the first (101) and the second slide (102).

10. The handling device according to claim 7, wherein the handling device comprises a horizontal, temporary storage means on which cavity-free groups, in particular in the form of two-dimensional contoured group fields, can be formed by means of the transfer gripper (108).

11. An injection molding system comprising an injection molding device (112) comprising an injection mold tool (111) and a handling device according to claim 1, wherein the injection mold tool (111) has several cavities disposed adjacent to each other, for the production of plastic injection-molded parts, and wherein the y-axis and the x-axis extend parallel to the injection mold surface (110) in a removing position of the removal gripper.

12. The handling device according to claim 1, wherein the several cavities are disposed annularly or rectangular-annularly around the respective center.

13. The handling device according to claim 1, wherein the x-axis is horizontal.

14. The handling device according to claim 1, wherein the slide arrangement has only two of the slides carrying the receiving positions.

15. The handling device according to claim 1, wherein the receiving position of the second slide (102) and/or the first slide (101) is spaced apart from the two receiving positions along the x-axis.

16. A method for the operation of a handling device according to claim 1, wherein while keeping the relative position of the x-axis of plastic injection-molded parts are removed from the cavities in a removing position of the removal gripper when the first slide (101) and second slide (102) are in the relative removing position in such a manner that a plastic injection-molded part, which is disposed in a receiving position of the second slide (102), is disposed along the x-axis between two plastic injection-molded parts, which are each disposed in a receiving position of the first slide (101) and/or wherein a plastic injection-molded part, which is disposed in a receiving position of the first slide (101), is disposed along the x-axis between two plastic injection-molded parts, which are each disposed in a receiving position of the second slide (102).

17. The method according claim 16 wherein the first (101) and the second slide (102) are displaced from the relative removal position to a relative transfer position relative to each other via a superimposed displacing movement (displacing stroke V) of the removal gripper from the removal position (101) to a transfer position ($U_1$, $U_2$), in such a manner that plastic injection-molded parts are solely disposed in parallel rows extending along the y-axis and/or wherein in the relative transfer position, rows of row pairs are disposed closer to each other along the x-axis than in the relative removal position.

18. The method according to claim 16, wherein the plastic injection-molded parts are transferred to a transfer gripper (108) in two steps in the relative transfer position, while keeping the row arrangement of the plastic injection-molded parts, wherein between the steps, by displacing the first (101) and the second slide (102) together along the x-axis, a relative movement between the removal gripper and the transfer gripper (109) is realized while keeping the relative transfer position of the slides (101, 102), in such a manner that the receiving positions (1-32; 104, 105) on the transfer gripper (108) are disposed differently relative to each other in comparison to the situation on the transfer gripper (108), in such a manner that the distance of the rows of plastic injection-molded parts along the x-axis is varied when transferred.

19. The method according to claim 16, wherein entire rows of plastic injection-molded parts are transferred from the removal gripper to the transfer gripper (108) during the respective transfer step and/or wherein plastic injection-molded parts are transferred from the removal gripper to the transfer gripper (108) by both the first (101) and the second slide (102) during each of the transfer steps.

20. The method according to claim 16, wherein cavity-free groups of plastic injection-molded parts designed in the form of two-dimensional, group fields, are formed in a horizontal, temporary storage (109) by means of the transfer gripper (108) and wherein final packaging is loaded in a cavity-free manner or sorted by cavity, wherein final packaging which is sorted by cavity only comprises plastic injection-molded parts from one part of the groups.

* * * * *

UNITED STATES PATENT AND TRADEMARK OFFICE
CERTIFICATE OF CORRECTION

PATENT NO. : 10,857,711 B2  
APPLICATION NO. : 16/102783  
DATED : December 8, 2020  
INVENTOR(S) : Wolfgang Czizegg et al.

It is certified that error appears in the above-identified patent and that said Letters Patent is hereby corrected as shown below:

In the Claims

Column 13, Line 45, after "parts" and before "are" insert --, the plastic injection-molded parts--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*